United States Patent [19]

Benson

[11] Patent Number: 6,047,242
[45] Date of Patent: Apr. 4, 2000

[54] COMPUTER SYSTEM FOR PROTECTING SOFTWARE AND A METHOD FOR PROTECTING SOFTWARE

[75] Inventor: Glenn Benson, Munich, Germany

[73] Assignee: Siemens Aktiengesellschaft, Munich, Germany

[21] Appl. No.: 08/936,455

[22] Filed: Sep. 24, 1997

[30] Foreign Application Priority Data

May 28, 1997 [EP] European Pat. Off. .............. 97710013

[51] Int. Cl.⁷ .................................................. H04N 1/413
[52] U.S. Cl. ........................... 702/35; 713/169; 713/170; 380/277; 380/283
[58] Field of Search ..................................... 380/277, 283, 380/284; 713/168, 169, 170, 171

[56] References Cited

U.S. PATENT DOCUMENTS

| | | | |
|---|---|---|---|
| 5,923,763 | 7/1999 | Walker et al. | 380/51 |
| 5,935,246 | 8/1999 | Benson | 713/200 |
| 5,937,066 | 8/1999 | Gennaro et al. | 380/21 |
| 5,940,516 | 8/1999 | Mason et al. | 380/49 |

OTHER PUBLICATIONS

Davis et al., "Cryptographic Randomness from Air Turbulence in Disk Drives", Advances in Cryptology: Crypto '94, Springer Verlag, pp. 114–120.

A. Menezes et al., Handbook of Applied Cryptography, CRC Press, pp. 405–424.

A. Choudhury et al., "Copyright Protection for Electronic Publishing Over Computer Networks", IEEE Network, May/Jun. 1995, pp. 12–20.

ISO/IEC 9594–1, "Information technology—Open Systems Interconnection—The Directory: Overview of concepts, models and services", International Organization for Standardization, Geneva, Switzerland, 1995, pp. 1–20.

R. Rivest "The MD5 Message–Digest Algorithm", RFC 1321, pp. 1–18.

D. Knuth, The Art of Computer Programming, vol. 2, Seminumerical Algorithms, Addison–Wesley Publishing Co., Reading MA, 2$^{nd}$ Edition, 1981, pp. 38–73.

Primary Examiner—Thomas R. Peeso
Attorney, Agent, or Firm—Hill & Simpson

[57] ABSTRACT

A method for protecting an item of software, wherein at least one first challenge means is associated with said protected item of software, and at least one first response means accesses one private keying material. At least a third means (either challenge or response also exists). The first challenge means has no access to the said private keying material. The first response means proves to the first challenge means that the first response means has access to the private keying material. The first challenge means validates this proof using the public keying material that corresponds to the first response means' private keying material.

153 Claims, 4 Drawing Sheets

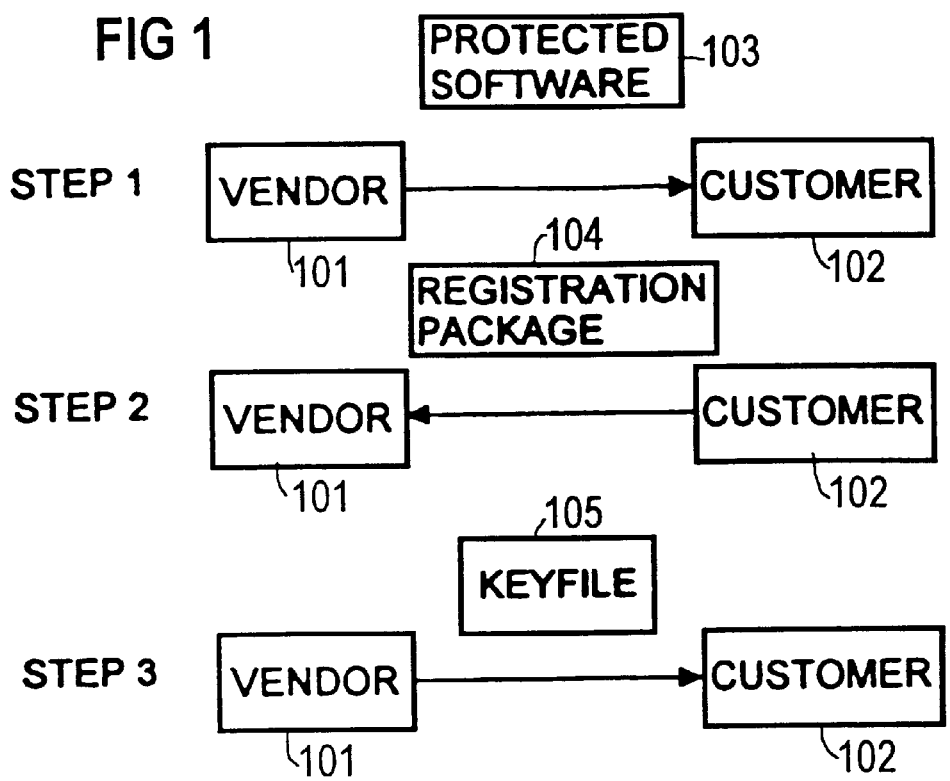
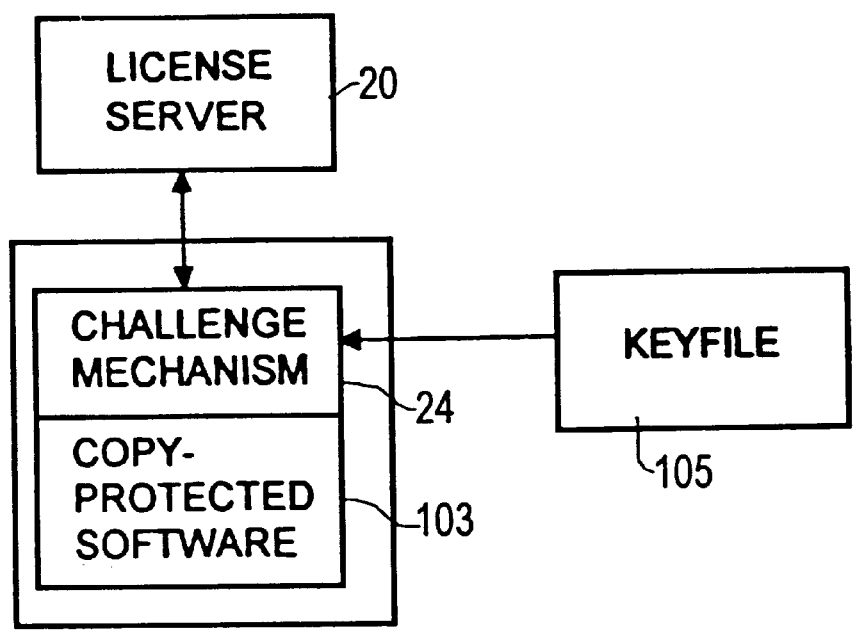

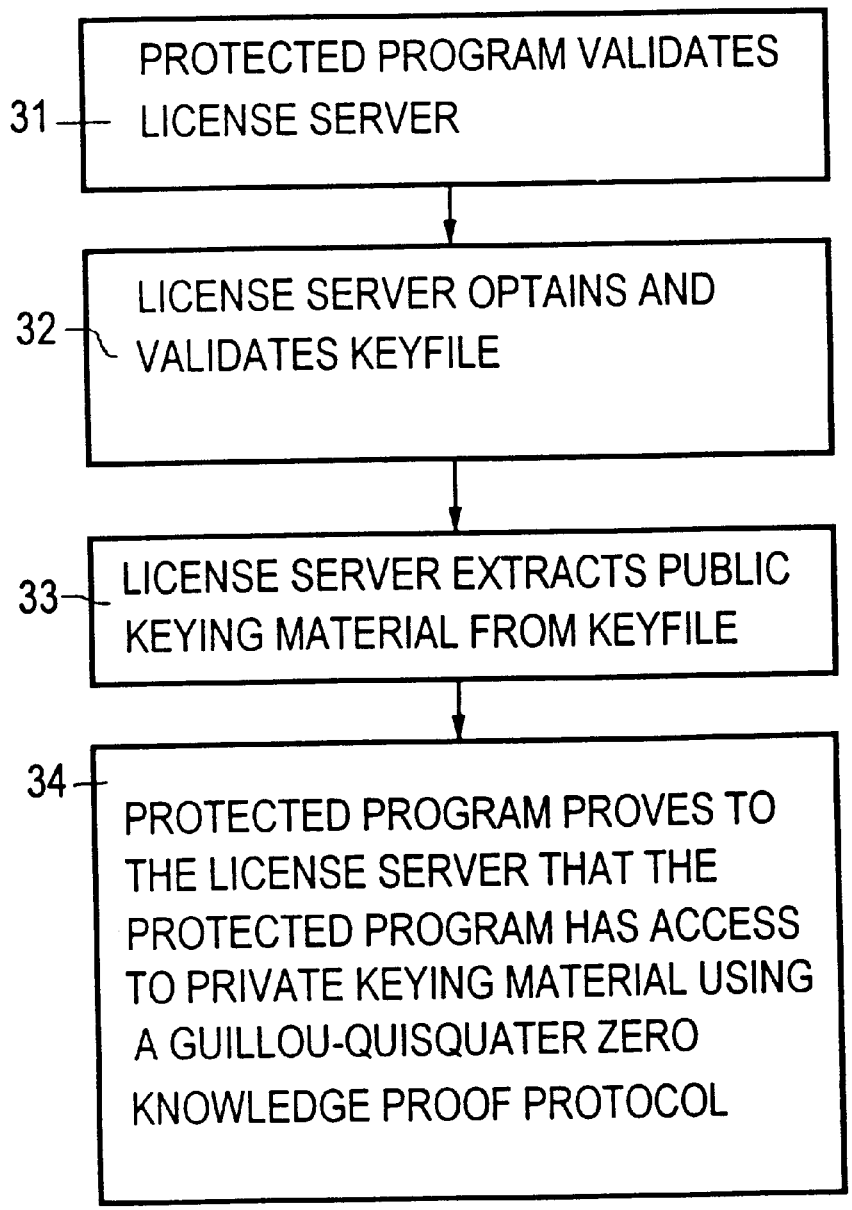

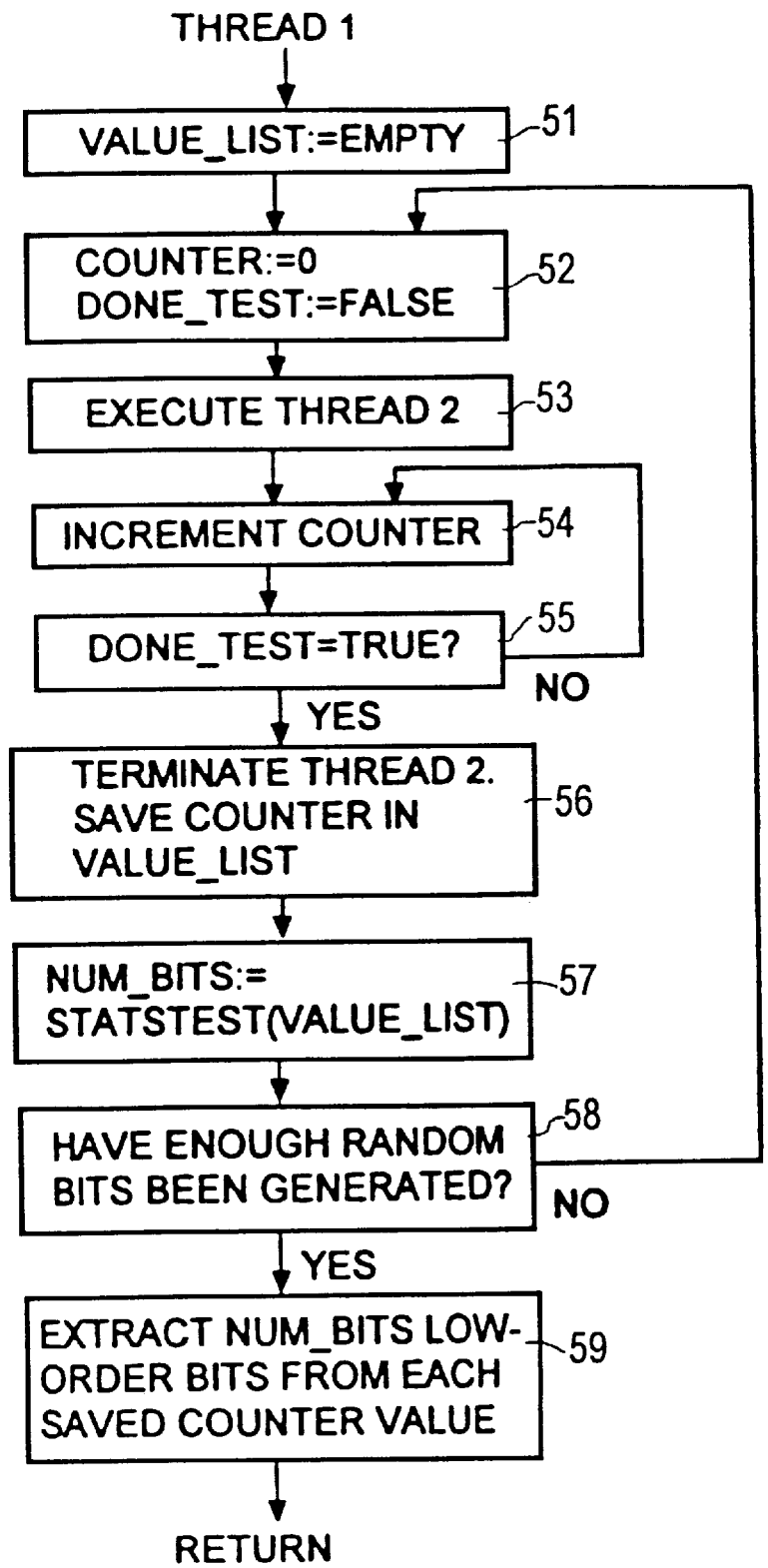

COMPUTER SYSTEM FOR PROTECTING SOFTWARE AND A METHOD FOR PROTECTING SOFTWARE

BACKGROUND OF THE INVENTION

1. Field of the Invention

The present invention relates to mechanisms for protecting software against unauthorized use and, in particular, against unauthorized copying and license violation.

2. Description of the Related Art

The Business Software Alliance estimates the 1995 financial losses attributed to software piracy as US$ 8.1 Billion for business application software and US$ 15.2 Billion for all software.

Solutions have been proposed in two areas:
improved Intellectual Property Rights (IPR) legislation, and enhanced electronic copy and license protection (ECP) mechanisms.

IPR legislation and enforcement are improving in many countries, but there are still significant difficulties in other parts of the world. As a result, some software vendors are currently reassessing ECP.

Some example requirements that an ECP mechanism may potentially satisfy the need for piracy prevention are listed below:

Unauthorized users or customers should be prohibited from executing protected software.

Customers should be prohibited from executing software without a valid license.

The customer should not be prohibited from making backup copies of the software.

The ECP mechanism should have minimal impact upon the user interface. The visible impact should be limited to the first initial login to the operating system and/or smart card.

Only standard hardware and software assumptions should be made. For example, although hardware dongles provide copy protection services, many vendors do not wish to limit the sale of the software to the collection of customers who own or are willing to install a dongle.

The ECP mechanism should not limit execution of the protected software to a limited collection of machines. When a customer legitimately purchases software, the customer should be able to execute the software on any machine regardless of ownership. The customer should optionally be able to authorize simultaneous execution of the software in multiple machines.

The ECP mechanism should have no required network dependencies in order to execute an already purchased protected program.

The vendor should be permitted to distribute an identical version of the protected software to all customers. This requirement permits the protected software to be distributed through normal channels such as, for example, CD-ROMs, floppy disks, or network bulletin boards.

It should be excessively difficult and/or computationally infeasible for a potential software pirate to circumvent the ECP mechanism without modifying the protected program. This requirement also serves as an virus-protection measure because a digital signature supplied by the vendor would not validate if a pirate distributes a modified version of the original program.

The ECP mechanism should not disclose the private keying material to the vendor, to any program produced by the vendor, or to any potential Trojan horse program. Though the primary functionality is to protect the software vendor, one must not do so at the expense of the customer.

The ECP mechanism should be available in a software-only version as well as in a hardware-assisted version, using a smart card, for example, to assure widespread market acceptance.

In the publication by Choudhury et al., entitled, "Copyright Protection for Electronic Publishing over Computer Networks", a mechanism is proposed in which a protected document can be viewed only via a specially configured viewer program, which allows a customer to view the document only if the customer supplies to the viewer the customer's private keying material. This deters the customer from distributing unauthorized copies of the viewer program, since that would require the customer to divulge his or her private keying material to others. However, because this mechanism requires that the viewer program obtain access to the private keying material, it breaks one of the requirements described above. Furthermore, this mechanism may not be used in conjunction with a smart card that is configured to avoid releasing private keying material.

An overview on asymmetric cryptography, for example on the RSA (Rivest-Shamir-Adleman) scheme, symmetric cryptography, and probabilistic encryption, for example the Blum-Goldwasser probabilistic public-key encryption scheme can be found in "Handbook of Applied Cryptography" by Menezes, et al.

An overview of digital signature schemes (e.g. Rivest-Shamir-Adleman (RSA) scheme, etc.,) and a formal mathematical definition of digital signatures can be found in the Menezes book.

An example of a message digest function (otherwise known as a one-way hash function) is MD5 as described in the publication by Rivest, "The MD5 Message-Digest Algorithm". It is computationally infeasible or very difficult to compute the inverse of a message digest.

The Chi-Square Test, the Kolmogorov-Smirnov Test, and the Serial Correlation Test are described in "The Art of Computer Programming" by Knuth.

In the publication by Fenstermacher et al., cryptographic randomness from air turbulence in disk drives is described.

An overview over different probabilistic proof schemes, for example zero knowledge proof schemes (e.g. Feige-Fiat-Shamir scheme, Guillou-Quisquater scheme, Blum-Feldmann-Micali scheme, Brassard scheme, Crepau scheme, etc.) or witness hiding proof schemes (e.g. Feige-Shamir scheme, etc.) can be found in the Menezes book.

SUMMARY OF THE PRESENT INVENTION

An object of the present invention is to provide an improved ECP (electronic copy and license protection) mechanism that is able to satisfy most, if not all, of the example requirements described above.

A storage device is any mechanism that can store data and subsequently provide the data or information about the data. Examples of practical storage devices are smart cards, CD-ROMs, Digital Video Disks, and floppy disks.

In the Menezes book, certificates, certificate hierarchies, chains of certificates, certificate topologies, certification paths, and certification authorities are discussed. A root certificate (otherwise known as a Certificate Authority Certificate) is a certificate that holds the certification authority's public key. Typically, root certificates are signed using the certificate authority's private key. A descendent certificate is one that can be reached (or validated) from the root certificate via a certification path.

Software that is licensed may only use resources in accordance to the software license. For example, a software license may permit software to physically reside on a shared storage device yet prohibit the software from simultaneously executing on multiple machines. In this case the "resource" is a machine that executes the software. Another example of a resource is a file. In this case, the license server could potentially modify the access control list of a special file in order to permit licensed programs the ability to access the special file.

A program's binary code includes a sequence of instructions that a computer follows when the computer executes the program.

A chosen-plaintext attack is one where the adversary chooses plaintext and is then given corresponding ciphertext. Subsequently, the adversary uses any information deduced in order to recover plaintext corresponding to previously unseen ciphertext, as mentioned in the Menezes book.

An adaptive chosen-plaintext attack is a chosen-plaintext attack wherein the choice of plaintext may depend on the ciphertext received from previous results, also in the Menezes book.

A zero knowledge proof protocol is one kind of asymmetric method that is particularly suitable for copy protection and licensing. A zero knowledge proof does not suffer degradation of security with repeated use [and a zero knowledge proof resists] chosen-text attacks. These properties are especially desirable in copy protection and licensing because they provide excellent protection of private keying material. Suppose, for example, that private keying material were stored on a smart card. In this case, the customer could make the smart card available to a machine without concern of attack from a Trojan Horse or other program with ill-intent. A Trojan Horse, could not, for example, repeatedly query the smart card, using chosen queries, for the purpose of obtaining information that would be useful in subsequent cryptoanalysis.

A zero knowledge proof protocol resists both chosen-plaintext attacks and adaptive chosen-plaintext attacks.

As an example of a zero knowledge proof, consider the Guillou-Quisquater (GQ) zero-knowledge proof protocol, including two parties A and B, wherein A has the private keying material to which B has no access. A proves to B that A has access to the private keying material. The GQ proof protocol is described below.

In the following, we assume that an RSA key pair is as defined in Menezes. We use the notation from Menezes in the following description. Some aspects of this notation are: the RSA public key is (n,e), the RSA private key is d, $\gcd(e,\Phi))=1$, $\Phi=(p-1)(q-1)$, and $n=p \cdot q$.

Calculate System parameters:
a. Using the prime factorization, p and q, suitable for use in the computation of an RSA-like key pair, compute $n=p \cdot q$ and $\Phi=(p-1)(q-1)$
b. A defines a public exponent $\upsilon \geq 3$ with $\gcd(\upsilon,\Phi)=1$ where $\Phi$ and gcd is the Greatest Common Divisor.
c. A computes a private exponent $s=\upsilon^{-1}(\mod \Phi)$
d. System parameters $(\upsilon,n)$ are made available as the public keying material.

Calculate User parameters:
a. A selects and publishes a well known identity I and the redundant identity $J=f(I)$ satisfying $1<J<n$ using a known redundancy function $f$. An example of the redundancy function $f$ is the redundancy mapping of the preprocessing stage of ISO/IEC 9796, see the Rivest publication.
b. A retains as the private keying material $s_A=J^{-s}(\mod n)$.

The GQ key pair is (private key=$s_A$) and (public key=($\upsilon$, n)). A makes known to B, I,$f$, and $J=f(I)$. B validates that $J=f(I)$ (see Box 33).

The protocol messages of the GQ proof protocol are presented below:

$$A \rightarrow B: J, x=r^{\upsilon} \ (\mod n) \quad (1)$$

$$B \rightarrow A: e(\text{where } 1 \leq e \leq \upsilon) \quad (2)$$

$$A \rightarrow B: y=r \cdot s_A^{e} (\mod n) \quad (3)$$

A proves its identity to B by t executions of the following steps where B accepts A's identity only if all t executions are successful (see Box 34).
a. A selects a random secret integer r (the commitment), $1 \leq r \leq n-1$, and computes (the witness) $x=r^{\upsilon}(\mod n)$
b. A sends to B the pair of integers (I,x)
c. B selects and sends to A, a random integer e (the challenge), $1 \leq e \leq \upsilon$
d. A computes and sends to B (the response) $y=r \cdot s_A^{e}(\mod n)$
B receives y, constructs J from I using $f$, computes $z=J^e \cdot y^{\upsilon}$ (mod n) and accepts A's proof of identity if both z=x and z≠0.
$Z_n$ is the set of integers modulo n
$Z_n^* = \{X \in Z_n | \gcd(x,n)=1\}$ The present invention makes use of a protocol that uses asymmetric cryptographic methods. Examples of asymmetric cryptographic methods are asymmetric confidentiality, digital signatures, and probabilistic proofs.

An asymmetric cryptographic method includes public keying material and corresponding private keying material. It is computationally infeasible to compute the private keying material when given no more information than the corresponding public keying material. In this invention, we use asymmetric cryptography in interactions between two parties, A and B. A proves to B that it has access to private keying material and B validates the proof. A does not disclose the private keying material to B.

Some examples of asymmetric cryptographic methods are described below.

A digital signature is an electronic analog of a handwritten signature. A digital signature proof involves at least two parties, A and B. After posting his or her public keying material to a public location, A encrypts a message using the private keying material. Since anyone may access the public keying material, there is no message secrecy. However, since A is the only customer with access to the private keying material, no one else can "forge A's signature" by performing the encryption. Anyone may validate A's signature using the public keying material.

An asymmetric confidentiality proof involves at least two parties, A and B. A possesses private keying material and B has no access to A's private keying material unless B discloses the private keying material itself (which B should not do). At the beginning, A and B have no shared secret. During the method, a shared secret becomes known to A and B.

An example of an asymmetric confidentiality proof is public key encryption. As illustrated in the asymmetric confidentiality protocol below. A proves to B that A knows the private keying material.

$$A \leftarrow B: h(r), B, P_A(r, B)$$

$$A \rightarrow B: r$$

The protocol scheme described above uses the following notation:
$A \rightarrow B$ denotes that A sends a message to B; and $B \rightarrow A$ denotes that B sends a message to A.
r denotes a random number used as a nonce h(r) is a message digest of the nonce $P_A(r,B)$ is encryption of the nonce and B's identity using A's public keying material Here, B generates a nonce and encrypts the nonce (together with B's identity) using A's public keying material, i.e., $P_A(r,B)$.

Additionally B computes the message digest of the nonce, h(r).

B sends the information described above, along with B's identity, to A.

Next, A uses its private keying material to decrypt PA(r,B) obtaining r,B. A computes the message digest of the decrypted random value, r, and compares the result against h(r) obtained from B.

At this point, the random number is a shared secret known by both A and B.

In order to complete the protocol, A returns the random number to B in order to demonstrate that A knows the secret. Of course, once A provides the disclosure, the secrecy of the random number is lost. B validates A's proof by checking A's returned secret with the one that B originally generated.

A second example of an asymmetric confidentiality proof protocol is a probabilistic encryption scheme, e.g. the Blum-Goldwasser probabilistic public key encryption scheme. Here, the encryption or decryption mechanism uses random numbers or other probabilistic means. One should not confuse probabilistic public-key encryption with probabilistic proofs, e.g., zero knowledge proofs. In the first case, probabilistic means are used to execute the encryption algorithm. In the second case, probabilistic means are used to define a degree of assurance. Probabilistic proofs are described below.

A probabilistic proof involves at least two parties, A and B. A possesses private keying material and B has no access to A's private keying material without disclosing the private keying material itself. A's proof is probabilistic rather than absolute because B forces A to demonstrate that A probably has access to the private keying material by supplying evidence.

There are two variants of probabilistic proofs:

a) zero-knowledge-proofs, where it is provable that B or any observer of the proof learns nothing from the proof, except the fact that A possesses the private keying material.

b) witness-challenge-response-proofs, which comprise the following four elements in a sequence:

1. A sends information, which is not constant for all invocations of the proof, to B. This information is called the witness. For many protocols, the witness is generated randomly and should never be repeated.

2. B sends information to A, called the challenge. For many protocols, the challenge is generated randomly.

3. A sends a response to B.

4. B verifies whether A indeed knows the private keying material by executing computations involving the witness, the challenge, and the response.

In fact, many zero-knowledge-proofs are witness-challenge-response-proofs.

Zero knowledge proof schemes are e.g. the Feige-Fiat-Shamir scheme or the Guillou-Quisquater scheme, but also the Mono-directional zero knowledge proof schemes, e.g. the Blum-Feldmann-Micali scheme, or Statistical zero knowledge proof schemes, e.g. the Brassard scheme or the Crepau scheme, etc.

Witness hiding proof schemes are e.g. the Feige-Shamir scheme, etc.

In the following, one possible general structure of a zero-knowledge protocol is described (cp. Menezes). For illustrative purposes, this general structure is also of the witness-challenge-response-proof format.

The protocol involves two parties, A and B.

1. The prover claiming to be A selects a random element from a pre-defined set as its secret commitment (providing hidden randomization), and from this computes an associated (public) witness. This provides initial randomness for variation from other protocol runs and defines a set of questions all of which the prover claims to be able to answer, thereby a priori constraining his or her forthcoming response. Only the legitimate party A, with knowledge of A's secret, is truly capable of answering all the questions, and the answer to any one of these provides no information about A's long-term secret.

2. B's subsequent challenge selects one of these questions.

3. A provides its response.

4. B checks the response for correctness.

The protocol may be iterated to improve the bounds limiting the probability of successful cheating. Each customer may post his or her public keying material to a publicly accessed directory without compromising the corresponding private keying material. The customer usually should guard his or her private keying material as a close secret, as otherwise the cryptographic system may not guarantee correctness. The best known mechanism for protecting one's private keying material is through the use of a smart card. In this case, the smart card is a device with no interface for releasing private keying material (in a non-cryptographically protected form).

Although smart cards provide the best protection, social factors of electronic commerce may provide a role in ensuring private keying material protection. One of the significant difficulties associated with asymmetric cryptographic services is authentication. For example, if A posts his or her public keying material to a public directory, then how does B assess validity? That is, a pirate may attempt to masquerade as A but post the pirate's keying material. Some commercial organizations provide solutions to this problem by acting as Certification Authorities (CA). For (possibly) a fee, the CA solicits identifying material from potential customers such as a driver's license or passport. After validating the identifying material, the CA posts the customer's public keying material to a public directory, and the CA signs a certificate (using a digital signature with the CA's private key) that holds the customer's public keying material. Standardized services, for example X.500, may be adopted to help facilitate the use of directories that contain public keying material.

Once a customer posts his or her public keying material to the CA, the customer should make an effort to protect his or her private keying material. In this case, if the customer's private keying material were to become compromised, then the private keying material could no longer be used in a meaningful way. For some asymmetric keys, if the customer's private keying material were to become unknowingly compromised, then the customer would have cause for significant concern. For example, in the case of RSA (Rivest-Shamir-Adleman) keys that can be used for digital signatures, networked vendors could potentially authorize electronic commerce transactions.

According to the present invention, there is provided a computer system comprising a protection mechanism for protecting software, the protection mechanism comprising at least three items wherein there are at least a challenge means associated with a protected item of software and a first response means having access to private keying material of an asymmetric key pair and being able to communicate with the challenge means, and a second response means being able to communicate with the challenge means, wherein a) the challenge means has no access to the private keying material accessed by the first response means, b) the challenge means comprises means for validating an asymmetric proof of the first response means and n proof of the second response means without requiring that the first response means disclose its private keying material, respectively, c) the challenge means comprises means for prohibiting a protected program from executing unless either or both validations is or are successful.

In the subsequent text we use the terms response means and asymmetric response means interchangeablyin order to denote asymmetric response means. When discussing symmetric response means we explicitly use the term in its entirety.

According to the present invention, the way of proving that an asymmetric response means has access to the private keying material is not important, e.g any of the above described principles may be used, e.g. asymmetric confidentiality proof, digital signatures proof, or probabilistic proof.

According to a further aspect of the invention there is provided a computer system comprising a protection mechanism for protecting software, the protection mechanism comprising at least four items wherein there are at least a first challenge means associated with a protected item of software and a second challenge means, a first response means having access to private keying material of an asymmetric key pair and being able to communicate with the first challenge means, and a second response means having access to secret keying material being able to communicate with the second challenge means, wherein a) the first challenge means has no access to the private keying material accessed by the first response means, b) the first challenge means validates an asymmetric proof of the first response means that the first response means has access to the private keying material without requiring that the first response means disclose the private keying material, c) the second challenge means validates a proof of the second response means that the second response means has access to the secret keying material, d) the first challenge means or the second challenge means prohibit using the protected item of software or prohibit using the software in an unlimited mode unless either or both of the validations is or are successful.

According to a further aspect of the present invention there is provided a computer system comprising means for inputting a program to be protected, and for embedding at least three items wherein there are at least a challenge means associated with a protected item of software and a first response means having access to private keying material of an asymmetric key pair and being able to communicate with the challenge means, and a second response means being able to communicate with the challenge means, wherein a) the challenge means has no access to the private keying material accessed by the first response means, b) the challenge means comprises means for validating an asymmetric proof of the first response means and a proof of the second response means without requiring that the first response means disclose its private keying material, respectively, c) the challenge means comprises means for prohibiting a protected program from executing unless either or both validations is or are successful.

According to a further aspect of the invention, there is provided a computer system comprising means for inputting a program to be protected, and for embedding at least four items wherein there are at least a first challenge means associated with a protected item of software and a second challenge means, a first response means having access to private keying material of an asymmetric key pair and being able to communicate with the first challenge means, and a second response means having access to secret keying material being able to communicate with the second challenge means, wherein a) the first challenge means has no access to the private keying material accessed by the first response means, b) the first challenge means validates an asymmetric proof of the first response means that the first response means has access to the private keying material without requiring that the first response means disclose the private keying material, c) the second challenge means validates a proof of the second response means that the second response means has access to the secret keying material, d) the first challenge means or the second challenge means prohibit using the software or prohibit using the software in an unlimited mode unless either or both of the validations is or are successful.

According to a further aspect of the invention, there is provided a method of distributing software to a plurality of customers wherein each customer has a computer system comprising a protection mechanism for protecting software, the protection mechanism comprising at least three items wherein there are at least a challenge means associated with a protected item of software and a first response means having access to private keying material of an asymmetric key pair and being able to communicate with the challenge means, and a second response means being able to communicate with the challenge means, wherein a) the challenge means has no access to the private keying material accessed by the first response means; b) the challenge means comprises means for validating an asymmetric proof of the first response means and a proof of the second response means without requiring that the first response means disclose its private keying material, respectively, c) the challenge means comprises means for prohibiting a protected program from executing unless either or both validations is or are successful, and wherein every customer receives an identical copy of the protected program and of the challenge means.

According to a further aspect of the invention, there is provided a method for protecting an item of software comprising a protection mechanism for protecting software, the protection mechanism comprising at least three items wherein there are at least a challenge means associated with a protected item of software and a first response means having access to private keying material of an asymmetric key pair and being able to communicate with the challenge means, and a second response means being able to communicate with the challenge means, wherein a) the challenge means has no access to the private keying material accessed by the first response means and the second response means, respectively, b) the challenge means validates an asymmetric proof of the first response means and an asymmetric proof of the second response means without requiring that the first response means or the second response means disclose its private keying material, respectively, c) the challenge prohibits a protected program from executing unless either or both validations is or are successful.

According to a further aspect of the invention, there is provided a method for protecting an item of software comprising a protection mechanism for protecting software, the protection mechanism comprising at least four items wherein there are at least a first challenge means associated with a protected item of software and a second challenge means, a first response means having access to private keying material of an asymmetric key pair and being able to communicate with the first challenge means, and a second response means having access to secret keying material being able to communicate with the second challenge means, wherein a) the first challenge means has no access to the private keying material accessed by the first response means,
b) the first challenge means validates an asymmetric proof of the first response means that the first response means has access to the private keying material without requiring that the first response means disclose the private keying material,
c) the second challenge means validates a proof of the second response means that the second response means has access to the secret keying material,
d) the first challenge means or the second challenge means prohibit using the protected item of software or prohibit using the software in an unlimited mode unless either or both of the validations is or are successful.

According to a further aspect of the invention, it may be advantageous to generate a random challenge by repeatedly timing responses to device accesses in order to enforce the security of the random challenge. Although one may potentially time responses to any one of a variety of devices, in this present example we assume use of a disk (commonly known as a hard disk and sometimes known as a direct access storage device) as the device. Additionally, it is possible to query multiple different devices when generating one particular random value.

According to a further aspect of the invention, in order to further enforce the security of the random challenge one may, while generating the random challenge, fork new threads in such a manner as to introduce an additional degree of randomness into the random challenge by exploiting unpredictabilities in the operating system's scheduler.

According to a further aspect of the invention, in order to further enforce the security of the random challenge one may perform a statistical test to determine the number of random bits obtained by each of the disk accesses, and cause disk accesses to be repeated until a predetermined number of random bits has been obtained.

According to a further aspect of the invention, it is advantageous to include a root certificate which is accessed and trusted by the challenge means. The purpose of the root certificate is to authenticate a particular descendent certificate. The descendent certificate holds public keying material that is used to validate the proof provided by a response means. In some cases, it may be advantageous to use multiple root certificates, e.g, that holds the public keying material that corresponds to the private keying material accessed by each of a plurality of response means.

The method as well as the computer systems may be used for copy protecting software and/or for licensing software.

In the case of multiple challenge means embedded in either a single program or multiple programs, the respective challenge means may participate in proofs that demonstrate either the presence of the same private keying material or possibly different private keying material.

BRIEF DESCRIPTION OF THE DRAWINGS

FIG. 1 is a flow diagram of a purchasing protocol used when a customer wishes to purchase software that is protected by a protection mechanism in accordance with the invention.

FIG. 2 is a block diagram showing the software components that are required to be installed in the customer's machine to enable the customer to run the protected software.

FIG. 3 is a flow diagram showing the operation of the protection mechanism in the protected software.

FIG. 4 is a flowchart showing the operation of a random number generator used to generate nonces.

DETAILED DESCRIPTION OF THE PREFERRED EMBODIMENTS OF THE INVENTION

Figure 5:
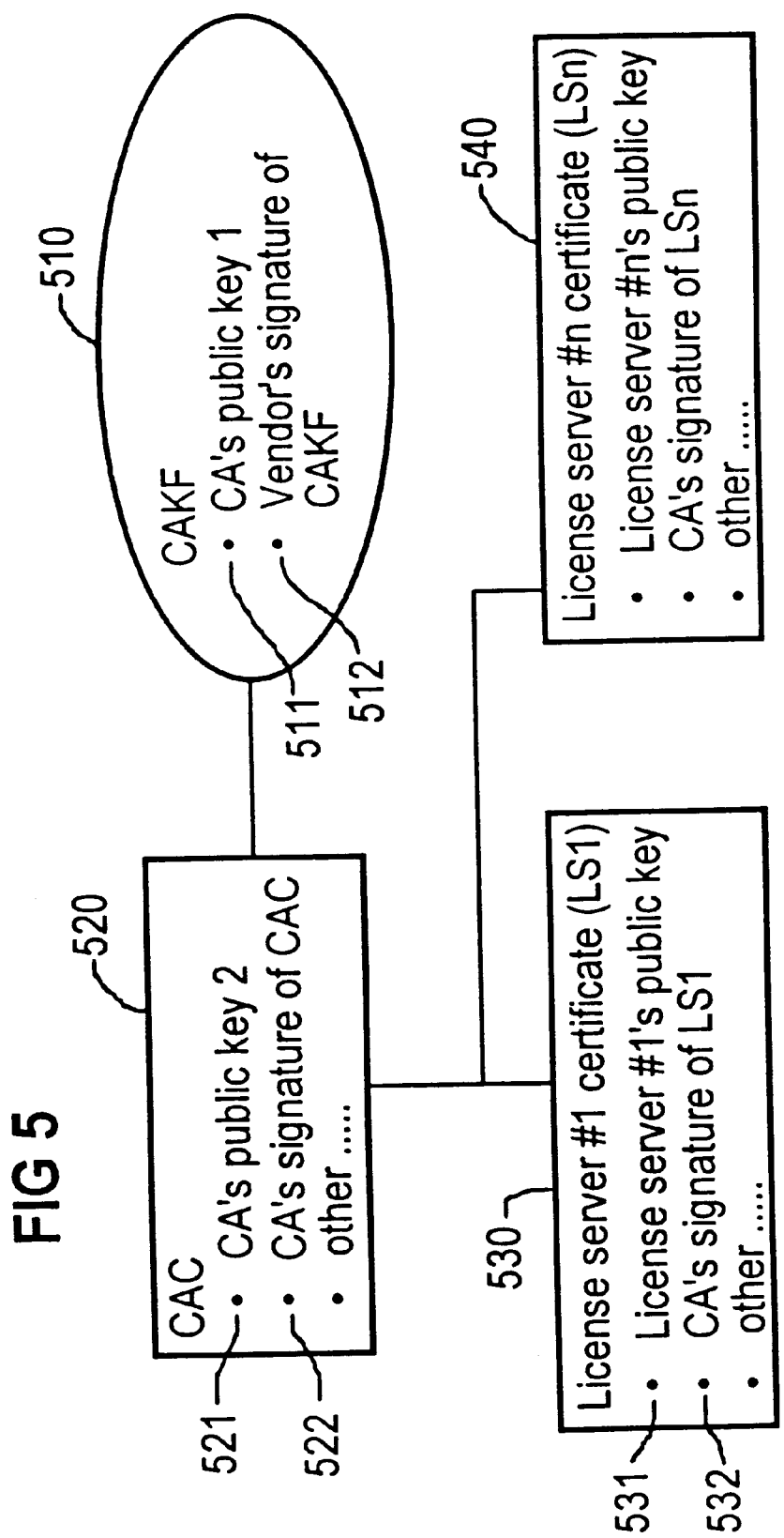
FIG. 5 shows a certificate infrastructure in accordance with the invention.

A protection mechanism in accordance with the invention will now be described by way of example with reference to the accompanying drawings.

Purchasing protocol

FIG. 1 shows a purchasing protocol used when a customer 102 wishes to purchase software that is protected by an ECP (electronic copy and license protection) mechanism in accordance with the present invention. The vendor 101 has public and private keying material used for digital signatures; and each potential customer 102 has public and private keying material used for asymmetric proof protocols. Each party makes its public keying material available to other parties, but keeps its private keying material secret.

In step 1, the customer 102 obtains the protected software 103 from a vendor 101 by downloading the software from a network bulletin board. A challenge mechanism 24 (cp. FIG. 2), to be described later in detail, is embedded in the protected software 103 in such a way that a potential attacker cannot easily separate the challenge mechanism 24 from the protected program 103. The attacker would need to disassemble the code and to manually remove the challenge mechanism. The challenge mechanism 24 has the vendor's public keying material embedded in it. As will be described, the challenge mechanism 24 prevents the customer from running the software at this stage. The entire protected program, including the challenge mechanism is signed using the vendor's private keying material.

In step 2, the customer 102 sends a registration package 104 to the vendor 101 by electronic mail. The registration package 104 contains a reference to a public directory that holds the customer's public keying material.

In step 3, the software vendor 101 locates the customer's public keying material and embeds the customer's public keying material into a keyfile 105 and sends the keyfile 105 to the customer 102 by electronic mail. Once the customer 102 installs the keyfile, the protection mechanism permits the customer 102 to execute the protected software 103 provided that the customer can prove that he or she has access to the customer's private keying material. In the case of licensed software, the software may need to obtain resources from the license server in order to execute in an unlimited mode.

The creation of the keyfile 105 is performed by a keyfile generator, which is a program that executes at the vendor's facility. The vendor 101 must take care to guard this program.

In use of the keyfile generator, an operator enters the following information:

Vendor name: Vendor name is the name of the vendor's company.

Vendor password: Vendor password is the password that unlocks the vendor company's private keying material.

Company employees who do not know the password cannot generate keyfiles.

Customer name: The customer name is the distinguished name of a customer (as defined in the publication "Information Technology—Open Systems Interconnection—The Director: Overview of Concepts, Models and Services" for whom to generate a keyfile. The name indexes into a database of public keying material.

Keyfile name: The keyfile name is the name of a new keyfile.

After obtaining this information, the keyfile generator builds a keyfile 105 containing the customer's public keying material. Portions of the keyfile 105 appears to the customer 102 as a completely random sequence of values.

Building of the keyfile 105 involves the following operations.

First, the keyfile generator creates a file and inserts the customer's public keying material into the file, along with thousands of decoy bits. In the present example, each keyfile 105 contains approximately 480,00 decoy bits. This number of bits represents a significant amount of decoy material, yet can fit into a standard e-mail (electronic mail) message.

Each keyfile 105 stores the customer's public keying material in a different location. Additionally, each keyfile 105 has encrypted customer information embedded in it without disclosing the required encryption key. This encrypted customer information permits a software vendor to easily identify the owner of a keyfile 105 in the event that the keyfile 105 appears in a public location, such as a bulletin board. The keyfile generator then encrypts and re-encrypts the keyfile (or portions of the keyfile) multiple times, using different algorithms. Finally, the keyfile generator signs the keyfile using the vendor's private keying material by applying a digital signature algorithm.

A keyfile is said to be validated if the challenge means can validate the vendor's signature using the public keying material stored in the challenge means' binary and access the decrypted public keying material stored in the keyfile.

Plurality of License Servers

FIG. 5 shows a certificate infrastructure that may be helpful when a plurality of license servers are used, or possibly when a single license server is used that periodically changes the keying material.

The challenge mechanism accesses a validated keyfile 510. During the validation procedure, the challenge mechanism extracts the vendor's public keying material from the protected program's binary and uses the vendor's public keying material to validate the signature 512 of the keyfile. We call this keyfile the CAKF 510 denoting the Certificate Authority Keyfile. Using the CA's public key stored in the CAKF 511, the challenge means validates the signature 522 of a Certificate Authority Certificate (CAC) 520.

The CAC 520 contains at least a public key 521 and a digital signature 522 of the entire CAC. After validation of this digital signature, we say that the CAC is validated.

The protected program 103 searches the file system for License Server Certificates (LSi, i=1 . . . n) stored in the file system. In this present example, assume that the LSi is 530.

Each License Server Certificate LSi contains at least the public key of the license vendor (the public key of license server) 531, and a digital signature of the entire LSi 532.

When the protected program 103 locates a License Server Certificate, LSi 530, the protected program 103 checks the available information to determine if the License Server Certificate LSi can be used.

Then, the protected program 103 validates the digital signature of the LSi in accordance with a chain of certificates until the chain ultimately reaches the validated CAC, as described in the Menezes book. Note that each certificate in the chain must be found by the challenge mechanism. Note also that in FIG. 5 the chain is short because the CA directly signs each of the License server certificates 532.

If the validation succeeds, the protected program 103 accepts the License Server Certificate LSi. We call this LSi certificate a validated license server certificate (VLSC).

The VLSC's public key 531 may subsequently be used to validate the license server.

Authentication of the License Server

To reach a mutual authentication between the protected program 103 and a license server Li, the protected program 103 validates that it is communicating with the correct license server Li and the license server Li validates that it is communicating with the correct protected program 103.

At least one of these two validations must execute a protocol that uses asymmetric cryptographic methods. In this present example, both validations use the GQ (Guillou-Quisquater) proof—an asymmetric cryptographic method with the zero knowledge property (as described above).

Validating the license server:

First the protected program obtains (including validation) a license server certificate VLSC using the method described above. A public key VLSCPK 531 is the public key VLSCPK 531 stored in the license server certificate VLSC. In accordance to the description of the GQ (Guillou-Quisquater) proof protocol above, the license server Li (as party A) proves to the challenge mechanism 24 (as party B) that the license server Li has access to private keying material LSPVTK. The challenge mechanism uses the public key VLSCPK 531 in the validation the GQ proof.

If the challenge mechanism 24 validates the proof, then the protected program 103 executes in an unlimited mode which is not constrained or limited by the copy protection or license system.

If the challenge mechanism 24 cannot validate the proof, then the protected program 103 stops executing, runs in a limited mode, or takes other appropriate action.

It is possible that the protected program 103 has embedded in it a single challenge means that communicates with multiple license servers in the manner described above. Alternatively, multiple challenge means may communicate with multiple license servers in the manner described above.

Mutual authentication between the protected program and the license server (See Box 31) (compare FIG. 3) First the protected program 103 validates the license server Li using the mechanism described above. Next, the license server Li validates the protected program 103 as described below.

The protected program 103 contains an embedded response means. This response means contains embedded private keying material PPPVTK where the private keying material PPPVTK is different than the license server's private keying material LSPVTK.

(Box 32) The license server Li obtains and validates a program's keyfile PPKF. The validation procedure is analogous to the validation procedure of the CAKF. In the validation procedure, the license server validates the digital signature of the PPKF using the license server's public keying material.

It should be noted that the protected program's keyfile PPKF is not the license server's keyfile CAKF.

(Box 33) The license server Li extracts the public keying material from the protected program's keyfile PPKF by performing multiple decryptions as required.

(Box 34) The protected program 103 proves to the license server Li that the protect program 103 has access to private keying material PPPVTK using a GQ proof protocol. The license server validates the proof using the public key extracted from the program's keyfile PPKF.

If the license server's validation succeeds, then the license server grants to the protected program resources that permit the protected program 103 to operate in a potentially unlimited mode. Otherwise the protected program 103 might execute in a limited mode.

As an alternative to the method described above, the license server may validate the protected program using symmetric keying material.

Before executing the protocol, the challenge means in the license server (denoted by B) and the response means in the protected program (denoted by A), each obtain access to the same symmetric keying material k. In the following protocol, the response means proves to the challenge means that the response means has access to the symmetric keying material.

$$A \leftarrow B: r_B \quad (1)$$

$$A \rightarrow B: h(k, r_B, B) \quad (2)$$

Step (1): First, the license server's challenge means generates a random number $r_B$, and sends the random number $r_B$ to A.

Step (2): Next, the protected program's response means extracts the shared keying material k, the random number $r_B$, and the unique identity of the license server B. The response means concatenates, in the following order: $k, r_B, B$. Next, using the message digest function, h, e.g., the message digest MD5, the response means computes $h(k, r_B, B)$. Finally, the challenge means performs a validation procedure by first recalling the shared keying material, k, and the random number generated in step (1) $r_B$, and the license server's identity B. The challenge means calculates $h(k, r_B, B)$ and compares the result (for equality) against the corresponding value received in Step (2). If the equality check succeeds, then the challenge mechanism accepts the proof, otherwise, the challenge mechanism rejects the proof.

As can be seen from both methods of mutual authentication, the response means proves that the response means has access to secret keying material.

In the case of asymmetric cryptography, the secret keying material is the private keying material of an asymmetric key pair. In the case of symmetric means, the secret keying material is a shared key. Note that in this case, we say that symmetric means includes both symmetric encryption algorithms such as the Data Encryption Standard (DES) and other algorithms in which the encryption key is derivable from the decryption key and vice versa. Symmetric means additionally includes message digests, such as MD5, or other cryptographic means in which both parties share common keying material.

Authenticating and Validating a second License Server

In the case of a protected program with an embedded challenge means that communicates with two or more response means, the mechanisms and methods of communication are identical. The challenge means uses the mechanisms and methods described above to validate first one response means and then the other. The challenge means may be configured to require validation of both response means or possibly just one. In either case, after successful validation the protected program may execute in an unlimited mode. Otherwise, the protected program ceases execution, or executes in a limited mode.

The challenge means may potentially communicate with the first response means using an asymmetric protocol and the challenge means may potentially communicate with the second response means using a symmetric protocol. Or, it could be the case that both protocols are symmetric.

Customer software

FIG. 2 shows the software components that are required to be installed in the customer's machine, such as a computer, to enable the customer to run the protected software 103 after the mutual authentication. These consist of a license server 20, the keyfiles 105, the protected software 103, and the certificates (not shown). The protected software 103 includes a challenge mechanism 24 and possibly a response mechanism (not shown). The license server accesses private keying material (not shown). In the case that the protected program includes a response mechanism, then the protected program's response mechanism accesses secret keying material.

The license server 20 is a program that the customer 102 executes when the system initially boots. The customer 102 enables the system by inserting a smart card that contains the customer's private keying material. The license server 20 then prompts the customer 102 for a pass phrase used to enable the smart card. The license software does not execute if the customer cannot supply the correct pass phrase to unlock the smart card. The license server does not obtain access to the private keying material stored on the smart card. The license server 20 then executes in the background.

Nonce generator

Generation of a nonce is performed by a nonce generator included in the challenge mechanism 24. Operation of the nonce generator is as follows.

First, the nonce generator queries a large number of system parameters, e.g. the system time, the amount of space remaining free in the page table, the number of logical disk drives, the names of the files in the operating system's directory, etc.

Next, the nonce generator builds a random number, using a random number generator. The random number generator consists of two process threads, referred to herein as Thread 1 and Thread 2. FIG. 4 shows the operation of Thread 1, which is the main thread of the random number generator.

(Box 51) Thread 1 first creates a data structure value_list, for holding a list of counter values. The list is initially empty.

(Box 52) Thread 1 sets a current counter value to zero, and sets a done_test flag to FALSE.

(Box 53) Thread 1 then forks Thread 2. Thread 2 posts an asynchronous disk access and then sleeps until the disk access is complete. When the disk access is complete, Thread 2 sets the done_test flag to TRUE. Note that Thread 1 and Thread 2 share the done_test flag.

(Box 54) Thread 1 increments the counter value by one.

(Box 55) Thread 1 then tests whether the done-test flag is now TRUE, indicating that the disk access initiated by Thread 2 is complete. If the done-test flag is FALSE, the thread returns to box 54. Thus, it can be seen that while waiting for the disk access to complete Thread 1 the counter value is continuously incremented.

(Box 56) When done_test flag is TRUE, Thread 1 terminates Thread 2 and saves the counter value in the first free location in the value list.

(Box 57) Thread 1 then calls a Statstest function, which estimates the degree of randomness of the counter values (or portions of counter values, e.g., low-order bits) saved in the value_list. This function may use the Chi-Square Test, the Kolmogorov-Smirnov Test, or the Serial Correlation Test, which are described in the Knuth book. The Statstest function may be optimized to ensure that complicated calculations are not repeated for each disk access. The Statstest function returns a value which indicates how many low-order bits of each saved counter value should be considered as random.

(Box 58) Thread 1 compares the value returned by the Statstest function when combined with the length of the value_list with a predetermined threshold value to determine whether enough random bits have now been generated. If not enough random bits have been generated, the process returns to box 52 above so as to generate and save another counter value.

(Box 59) When the required number of random bits has been generated, Thread 1 extracts the specified number of low-order bits from each counter value in the value_list and returns this sequence of bits as the output random number.

In summary, it can be seen that the random number generator 5 exploits the unpredictability in the timing of a series of disk accesses as a source of randomness in the generation of nonces (see the Fenstermacher publication). By forking new threads on each disk access, the random number generator also exploits unpredictabilities in the operation of the operating system's scheduler as a second source of randomness.

The analysis performed by the Statstest function permits the random number generator to self-tune for any speed processor and disk, by computing the number of low-order bits of each saved counter value to return. For example, a system with a high-variance disk access time will generate more random bits per-disk access than a system with a low-variance disk access time. For example, for a Quantum 1080s disk (6 ms average write time), and a 486 (Intel 80486) 66 Mhz processor, the system generates approximately 45 bits per second. Alternatively, one may hard code the number of bits per-disk access and use a de-skewing technique to ensure a good degree of randomness.

The nonce generator also queries the operating system to ensure that it posts each disk access to an actual disk. The final output nonce is formed by combining the output random number from the random number generator with the result of querying the system parameters as described above using a message digest.

The nonce generator described above works best when executing on an operating system that provides direct access to the disk, e.g., Microsoft Windows 95 or Microsoft Windows NT 4.0. In such an operating system, special operating system calls available to programs executing in user space permit a program to bypass the operating system's internal buffering mechanism and write directly to the disk. Most programs do not take advantage of these special operating system calls because they may be relatively inefficient and difficult to use. On Windows 95 and Windows NT, a program may only use these special calls if the program accesses data that is a multiple of the disk's sector size by querying the operating system.

If the operating system does not provide direct access to the disk, then the challenge mechanism 24 could still use the disk timing random number generator. However, in this case, the quality of the generated values would have a greater reliance upon unpredictabilities in the operating system's scheduler as opposed to the variance inherent to the disk access time.

The example of the invention described above assumes that the operating system permits a program to fork multiple threads within a single address space. Additionally, the example of the invention assumes that the operating system permits the threads to access synchronization variables such as semaphores. Most modern operating systems provide these services. The example of the invention uses multiple threads to implement a mechanism which quantifies each disk access time. However, if an implementation of the invention were to execute on a system that does not provide multiple threads or synchronization variables, then the nonce generator could substitute other mechanisms, e.g. querying a physical clock.

Some possible modifications

The customer need not get the software by downloading the software from a network bulletin board. The customer may also get the software on a floppy disk, or a CD-ROM at a PC store, via the Internet, or some other means of distribution.

Furthermore, a smart card may be used to store the customers or vendor's private keying material. In such a smart card-enabled configuration, a pirate cannot extract the private keying material from the smart card, which provides an even greater defense against attack.

Private keying material can be stored on an unsecured storage device, such as a floppy disk. In this case, the private keying material should be encrypted. A response mechanism should not be able to perform the decryption routine unless a customer first presents a password. In this case, the response means obtains access to the private keying material but does not release the private keying material out of its address space.

We may optionally extend this present example by constructing the challenge means to reference an internal timer, e.g., a counting thread, or an external timer, e.g., a clock. If an a priori defined threshold terminates before completing the probabilistic proof protocol, then the validation automatically fails.

Multiple programs may have embedded challenge means that communicate with the same response means. In this case, the response means could potentially use the same smart card to store the private keying material used in its interactions with all of the respective challenge means. Optionally, the programs may be configured so that the response means uses the same private keying material in its interactions with each of the respective challenge means.

A computer system that includes at least two response means may potentially include one response means that relies upon asymmetric cryptography and a second response means that does not. An example of a response means that does not use asymmetric cryptography is a dongle that relies upon symmetric cryptography. In this case the dongle has no access to asymmetric private keying material.

In addition to implementing copy protection, the mechanism described above may be used to trace software pirates. The mechanism provides excellent traceability, without requiring that each customer obtain a unique version of the program.

The license server 20, the challenge mechanism 24, and the protected software 103 described above may be deployed in a number of different configurations.

For example:

The license server 20 may reside in one address space and the challenge mechanism 24 and the protected software 103 may reside in a different address space in a single machine.

The license server 20 may reside in an address space on one machine and the challenge mechanism 24 and the protected software 103 may reside in a different address space on a different machine.

Furthermore, multiple customers, each with their own copy of the protected item of software, may share a common license server 20, which responds to challenges from all these copies.

Another alternative is that multiple customers may share common private keying material. A company may use one or more of these deployment options, for example, when constructing multi-user licensing functionality.

In another possible modification, the keyfile 105 may contain hidden information concerning selective activation of services of the protected program 103. For example, the keyfile 105 may specify that the protected program 103 may permit execution of a Print service but disable execution of a Save-On-Disk service. As another example, the keyfile 105 may contain an expiration date that describes the last date that a particular service may execute. The protected program 103 would read the keyfile 105 to determine the services that the protected program 103 should execute. A customer could obtain the ability to execute more services by requesting another keyfile from the vendor. If a license server fails to authenticate a program, then the license server can refuse to grant resources to the program. The program may, at its own discretion, refuse to operate certain services unless sufficient resources are obtained.

Although other modifications and changes may be suggested by those skilled in the art, it is the intention of the inventors to embody within the patent warranted hereon all changes and modifications as reasonably and properly come within the scope of their contribution to the art.

I claim:

1. A computer system, comprising:
   a protection mechanism for protecting software, the protection mechanism including
     a challenge means associated with a protected item of software,
     a first response means having access to private keying material of an asymmetric key pair and being able to communicate with said challenge means, and
     a second response means being able to communicate with said challenge means, wherein
     a) said challenge means has no access to the private keying material accessed by said first response means,
     b) said challenge means has means for validating an asymmetric proof of said first response means and a proof of said second response means without requiring that said first response means disclose its private keying material, respectively,
     c) said challenge means has means for prohibiting a protected program from executing unless at least one validation is successful.

2. A computer system according to claim 1, wherein said first response means and said second response means access private keying material held on a same storage device.

3. A computer system, comprising:
   a protection mechanism for protecting software, the protection mechanism including
     a first challenge means associated with a protected item of software,
     a second challenge means,
     a first response means having access to private keying material of an asymmetric key pair and being able to communicate with the first challenge means, and
     a second response means having access to secret keying material being able to communicate with the second challenge means, wherein
     a) said first challenge means has no access to the private keying material accessed by said first response means,
     b) said first challenge means validates an asymmetric proof of said first response means that said first response means has access to said private keying material without requiring that said first response means disclose said private keying material,
     c) said second challenge means validates a proof of said second response means that said second response means has access to said secret keying material,
     d) one of said first challenge means and said second challenge means prohibit using the software at least in an unlimited mode unless at least one of the said validations is successful.

4. A computer system, comprising:
   means for inputting a program to be protected and for embedding including
     at least a challenge means associated with a protected item of software,
     a first response means having access to private keying material of an asymmetric key pair and being able to communicate with the challenge means, and
     a second response means being able to communicate with the challenge means, wherein
     a) said challenge means has no access to the private keying material accessed by said first response means,
     b) said challenge means has means for validating an asymmetric proof of said first response means and a proof of said second response means without requiring that said first response means disclose its private keying material, respectively,
     c) said challenge means has means for prohibiting a protected program from executing unless at least one validation is successful.

5. A computer system, comprising:
   means for inputting a program to be protected and for embedding including
     a first challenge means associated with a protected item of software,
     a second challenge means,
     a first response means having access to private keying material of an asymmetric key pair and being able to communicate with the first challenge means, and
     a second response means having access to secret keying material being able to communicate with the second challenge means, wherein
     a) said first challenge means has no access to the private keying material accessed by said first response means,
     b) said first challenge means validates an asymmetric proof of said first response means that said first response means has access to said private keying material without requiring that said first response means disclose said private keying material,
     c) said second challenge means validates a proof of said second response means that said second response means has access to said secret keying material,
     d) at least one of said first challenge means and said second challenge means prohibit using the software at least in an unlimited mode unless at least one of the said validations is successful.

6. A computer system according to claim 3, wherein the secret keying material is private keying material of a second asymmetric key pair.

7. A computer system according to claim 3, wherein the secret keying material of said second response means is keying material of a symmetric key pair.

8. A computer system according to claim 1, further comprising:
   a storage system that holds at least some of the private keying material and that interacts via a protocol that resists chosen-plaintext attacks.

9. A computer system according to claim 1, further comprising:
a storage system that holds at least some of the private keying material and that interacts via a protocol that resists adaptive chosen-plaintext attacks.

10. A computer system according to claim 1, wherein
said first response means accesses a first private keying material, and
said second response means access a second private keying material.

11. A computer system according to claim 1, wherein a same private keying material is accessed by both said first and second response means.

12. A computer system according to claim 1, wherein a license server's private key, respectively, is accessed in the first and second response means.

13. A computer system according to claim 1, wherein said means for validating uses at least one proof selected form the following types of proofs:
digital signature,
asymmetric confidentiality, and
probabilistic proof.

14. A computer system according to claim 13, wherein said proof is said asymmetric confidentiality scheme which is the Blum-Goldwasserscheme.

15. A computer system according to claim 13, wherein said proof is said probabilistic proof scheme which is a zero knowledge proof scheme.

16. A computer system according to claim 13, wherein said proof is said probabilistic proof scheme which is a witness hiding proof scheme.

17. A computer system according to claim 3, wherein one of said first challenge means and said second challenge means includes means for issuing a random challenge as information.

18. A computer system according to claim 17, wherein said means for issuing a random challenge includes means for generating a random challenge by repeatedly timing responses to device accesses.

19. A computer system according to claim 18, wherein said means for generating a random challenge includes means for forking new threads in such a manner as to introduce an additional degree of randomness into said random challenge by exploiting unpredictabilities in an operating system's scheduler.

20. A computer system according to claim 18, wherein said means for generating a random challenge includes:
means for performing a statistical test to determine a number of random bits obtained by each of said device accesses, and
means for causing device accesses to be repeated until a predetermined number of random bits has been obtained.

21. A computer system according to claim 1, wherein said challenge means is embedded in said protected item of software.

22. A computer system according to claim 1, wherein said challenge means uses public keying material for validating a proof.

23. A computer system according to claim 22, wherein the system includes a keyfile for holding the public keying material.

24. A computer system according to claim 23, wherein the public keying material held in said keyfile is cryptographically secured, whereby it is computationally infeasible to alter any portion of the keyfile, including the public keying material, without altering the challenge means.

25. A computer system according to claim 24, wherein said keyfile includes information identifying a customer to which the software has been supplied.

26. A computer system according to claim 24, wherein said keyfile includes decoy bits for disguising the public keying material held therein.

27. A computer system according to claim 24, wherein at least one of said keyfile and the challenge means and the software includes information concerning selective activation of services of the software.

28. A computer system according to claim 27, wherein the challenge means validates the response means to at least partially determine whether a particular facility of the software.

29. A computer system according to claim 1, wherein said software includes a plurality of protected items of software, each having its own challenge means, and a single response means shared between all of said protected items.

30. A computer system according to claim 1, further comprising:
at least one root certificate used for validating descendant certificates, the descendant certificates including at least a public keying material for said response means.

31. A computer system according to claim 30, wherein said at least one root certificate is two root certificates, one of said root certificates for each of said first and second response means.

32. A computer system according to claim 1, wherein said protection mechanism provides one of copy protection for the software and for licensing software.

33. A method of distributing software to a plurality of customers, comprising the steps of:
providing each customer with a computer system with a protection mechanism for protecting software, the protection mechanism including
a challenge means associated with a protected item of software,
a first response means having access to private keying material of an asymmetric key pair and being able to communicate with said challenge means, and
a second response means being able to communicate with said challenge means, wherein
a) said challenge means has no access to the private keying material accessed by said first response means,
b) said challenge means has means for validating an asymmetric proof of said first response means and a proof of said second response means without requiring that said first response means disclose its private keying material, respectively,
c) said challenge means has means for prohibiting a protected program from executing unless at least one validation is successful, and
providing every customer with an identical copy of said software and of said challenge means.

34. A method for protecting an item of software, comprising the steps of:
providing a protection mechanism for protecting the software,
associating a challenge means with a protected item of the software,
accessing by a first response means to private keying material of an asymmetric key pair and being able to communicate with the challenge means, and
communicating by a second response means with the challenge means, wherein a) said challenge means having no access to the private keying material accessed by said first response means and said second response means, respectively, b) validating by said challenge means an asymmetric proof of the said first response means and a proof of the said second response means without requiring that said first response means disclose its private keying material, respectively, c) prohibiting a protected program from executing by said challenge means unless at least one of the validations is successful.

35. A method according to claim 34, further comprising the step of:

accessing private keying material held on a same storage device by said first response means and the said second response means.

36. A method for protecting an item of software, comprising the steps of:

providing a protection mechanism for protecting software, including:

providing a first challenge means associated with a protected item of software and providing a second challenge means, accessing private keying material of an asymmetric key pair with a first response means and being able to communicate with the first challenge means, and accessing a second response means having access to secret keying material and being able to communicate with the second challenge means, wherein a) the said first challenge means has no access to the private keying material accessed by said first response means, b) validating an asymmetric proof of the said first response means that the said first response means has access to said private keying material by said first challenge means validates without requiring that said first response means disclose said private keying material, c) validating a proof of said second response means that said second response means has access to said secret keying material by said second challenge means, d) prohibiting using the software at least in an unlimited mode by one of said first challenge means and said second challenge means unless at least one of said validations is successful.

37. A method according to claim 34, wherein the secret keying material is private keying material of a second asymmetric key pair.

38. A method according to claim 34, wherein the secret keying material is keying material of a symmetric key pair.

39. A method according to claim 34, further comprising the step of:

interacting via a protocol that resists chosen-plaintext attacks by a storage system that holds at least some of the private keying material.

40. A method according to claim 34, further comprising the step of:

interacting via a protocol that resists adaptive chosen-plaintext attacks by a storage system that holds at least some of the private keying material.

41. A method according to claim 34, further comprising the steps of:

accessing a first private keying material by the first response means, and accessing a second private keying material by the second response means.

42. A method according to claim 34, wherein at least said second challenge means has no access to and no knowledge about the private keying material stored in any of the at least two response means.

43. A method according to claim 34, further comprising the steps of:

securely storing in the at least two response means a license server's private key, respectively.

44. A method according to claim 34, further comprising the steps of:

marking the information using at least one of:
digital signature,
asymmetric confidentiality, and
probabilistic proof.

45. A method according to claim 44, wherein said information is marked using the asymmetric confidentiality scheme which is the Blum-Goldwasser scheme.

46. A method according to claim 44, wherein said information is marked using said probabilistic proof scheme which is a zero knowledge proof scheme.

47. A method according to claim 44, wherein said information is marked using said probabilistic proof scheme which is a witness hiding proof scheme.

48. A method according to claims 34, wherein said challenge means includes means for issuing a random challenge, and further comprising the step of:

issuing said random challenge.

49. A method according to claim 48, wherein said means for issuing a random challenge generates a random challenge by repeatedly timing responses to disk accesses.

50. A method according to claim 49, wherein said means for generating a random challenge forks new threads in such a manner as to introduce an additional degree of randomness into said random challenge by exploiting unpredictabilities in the operating system's scheduler.

51. A method according to claim 49, wherein said means for generating a random challenge performs a statistical test to determine a number of random bits obtained by each of said disk accesses, and causes disk accesses to be repeated until a predetermined number of random bits has been obtained.

52. A method according to claim 34, further comprising the step of:

embedding said challenge means in said protected item of software.

53. A method according to claim 34, further comprising the step of:

using first public keying material for encrypting the information by said challenge means.

54. A method according to claim 34, further comprising the step of:

holding first public keying material in a keyfile.

55. A method according to claim 54, further comprising the step of:

cryptographically securing the first public keying material held in said keyfile, whereby it is computationally infeasible to alter any portion of the keyfile, including the first public keying material, without altering the challenge means.

56. A method according to claim 55, wherein said keyfile includes information identifying a customer to which the protected item of software has been supplied.

57. A method according to claim 55, further comprising the step of:

including decoy bits for disguising the first public keying material in said keyfile.

58. A method according to claim 55, further comprising the step of:
including information concerning selective activation of services of the protected item of software in said keyfile.

59. A method according to claim 34, further comprising the step of:
using at least two root certificates, one for each response means, respectively, for validating descendant certificates, the at least two root certificates including at least a public keying material for each response means, respectively.

60. A method according to claim 34, further comprising the step of:
using said system for at least one of copy protecting software and for licensing software.

61. A computer system according to claim 5, wherein the secret keying material is private keying material of a second asymmetric key pair.

62. A computer system according to claim 5, wherein the secret keying material of said second response means is keying material of a symmetric key pair.

63. A computer system according to claim 3, further comprising:
a storage system that holds at least some of the private keying material and that interacts via a protocol that resists chosen-plaintext attacks.

64. A computer system according to claim 4, further comprising:
a storage system that holds at least some of the private keying material and that interacts via a protocol that resists chosen-plaintext attacks.

65. A computer system according to claim 5, further comprising:
a storage system that holds at least some of the private keying material and that interacts via a protocol that resists chosen-plaintext attacks.

66. A computer system according to claim 3, further comprising:
a storage system that holds at least some of the private keying material and that interacts via a protocol that resists adaptive chosen-plaintext attacks.

67. A computer system according to claim 4, further comprising:
a storage system that holds at least some of the private keying material and that interacts via a protocol that resists adaptive chosen-plaintext attacks.

68. A computer system according to claim 5, further comprising:
a storage system that holds at least some of the private keying material and that interacts via a protocol that resists adaptive chosen-plaintext attacks.

69. A computer system according to claim 3, wherein
the first response means accesses a first private keying material, and
the second response means accesses a second private keying material.

70. A computer system according to claim 4, wherein
the first response means accesses a first private keying material, and
the second response means accesses a second private keying material.

71. A computer system according to claim 5, wherein
the first response means accesses a first private keying material, and
the second response means accesses a second private keying material.

72. A computer system according to claim 3, wherein a same private keying material is accessed by both said first and second response means.

73. A computer system according to claim 4, wherein a same private keying material is accessed by both said first and second response means.

74. A computer system according to claim 5, wherein a same private keying material is accessed by both said first and second response means.

75. A computer system according to claim 3, wherein a license server's private key is accessed in the first and second response means.

76. A computer system according to claim 4, wherein a license server's private key is accessed in the first and second response means.

77. A computer system according to claim 5, wherein a license server's private key is accessed in the first and second response means.

78. A computer system according to claim 3, wherein said means for validating uses at least one proof selected form the following types of proofs:
digital signature,
asymmetric confidentiality, and
probabilistic proof.

79. A computer system according to claim 78, wherein said proof is said asymmetric confidentiality scheme which is the Blum-Goldwasser scheme.

80. A computer system according to claim 78, wherein said proof is said probabilistic proof scheme which is a zero knowledge proof scheme.

81. A computer system according to claim 78, wherein said proof is said probabilistic proof scheme which is a witness hiding proof scheme.

82. A computer system according to claim 4, wherein said means for validating uses at least one proof selected form the following types of proofs:
digital signature,
asymmetric confidentiality, and
probabilistic proof.

83. A computer system according to claim 82, wherein said proof is said asymmetric confidentiality scheme which is the Blum-Goldwasser scheme.

84. A computer system according to claim 82, wherein said proof is said probabilistic proof scheme which is a zero knowledge proof scheme.

85. A computer system according to claim 82, wherein said proof is said probabilistic proof scheme which is a witness hiding proof scheme.

86. A computer system according to claim 5, wherein said means for validating uses at least one proof selected form the following types of proofs:
digital signature,
asymmetric confidentiality, and
probabilistic proof.

87. A computer system according to claim 86, wherein said proof is said asymmetric confidentiality scheme which is the Blum-Goldwasser scheme.

88. A computer system according to claim 86, wherein said proof is said probabilistic proof scheme which is a zero knowledge proof scheme.

89. A computer system according to claim 86, wherein said proof is said probabilistic proof scheme which is a witness hiding proof scheme.

90. A computer system according to claim 5, wherein one of said first challenge means and said second challenge means includes means for issuing a random challenge as information.

91. A computer system according to claim 90, wherein said means for issuing a random challenge includes means for generating a random challenge by repeatedly timing responses to device accesses.

92. A computer system according to claim 90, wherein said means for generating a random challenge includes means for forking new threads in such a manner as to introduce an additional degree of randomness into said random challenge by exploiting unpredictabilities in an operating system's scheduler.

93. A computer system according to claim 90, wherein said means for generating a random challenge includes
means for performing a statistical test to determine the number of random bits obtained by each of said device accesses, and
means for causing device accesses to be repeated until a predetermined number of random bits has been obtained.

94. A computer system according to claim 3, wherein said challenge means is embedded in said protected item of software.

95. A computer system according to claim 4, wherein said challenge means is embedded in said protected item of software.

96. A computer system according to claim 5, wherein said challenge means is embedded in said protected item of software.

97. A computer system according to claim 3, wherein said challenge means uses first public keying material for validating a proof.

98. A computer system according to claim 4, wherein said challenge means uses first public keying material for validating a proof.

99. A computer system according to claim 5, wherein said challenge means uses first public keying material for validating a proof.

100. A computer system according to claim 3, wherein the system includes a keyfile for holding first public keying material.

101. A computer system according to claim 100, wherein the public keying material held in said keyfile is cryptographically secured, whereby it is computationally infeasible to alter any portion of the keyfile, including the public keying material, without altering the challenge means.

102. A computer system according to claim 101, wherein said keyfile includes information identifying a customer to which the software has been supplied.

103. A computer system according to claim 101, wherein said keyfile includes decoy bits for disguising the public keying material held therein.

104. A computer system according to claim 101, wherein at least one of said keyfile and the challenge means and the software includes information concerning selective activation of services of the software.

105. A computer system according to claim 104, wherein the challenge means validates the response means to at least partially determine whether a particular facility of the software.

106. A computer system according to claim 4, wherein the system includes a keyfile for holding first public keying material.

107. A computer system according to claim 106, wherein the public keying material held in said keyfile is cryptographically secured, whereby it is computationally infeasible to alter any portion of the keyfile, including the public keying material, without altering the challenge means.

108. A computer system according to claim 107, wherein said keyfile includes information identifying a customer to which the software has been supplied.

109. A computer system according to claim 107, wherein said keyfile includes decoy bits for disguising the public keying material held therein.

110. A computer system according to claim 107, wherein at least one of said keyfile and the challenge means and the software includes information concerning selective activation of services of the software.

111. A computer system according to claim 110, wherein the challenge means validates the response means to at least partially determine whether a particular facility of the software.

112. A computer system according to claim 5, wherein the system includes a keyfile for holding first public keying material.

113. A computer system according to claim 112, wherein the public keying material held in said keyfile is cryptographically secured, whereby it is computationally infeasible to alter any portion of the keyfile, including the public keying material, without altering the challenge means.

114. A computer system according to claim 113, wherein said keyfile includes information identifying a customer to which the software has been supplied.

115. A computer system according to claim 113, wherein said keyfile includes decoy bits for disguising the public keying material held therein.

116. A computer system according to claim 113, wherein at least one of said keyfile and the challenge means and the software includes information concerning selective activation of services of the software.

117. A computer system according to claim 116, wherein the challenge means validates the response means to at least partially determine whether a particular facility of the software.

118. A computer system according to claim 3, further comprising:
a plurality of protected items of software each having its own challenge means, and a single response means shared between all of said protected items.

119. A computer system according to claim 4, further comprising:
a plurality of protected items of software each having its own challenge means, and a single response means shared between all of said protected items.

120. A computer system according to claim 5, further comprising:
a plurality of protected items of software each having its own challenge means, and a single response means shared between all of said protected items.

121. A computer system according to claim 3, further comprising:
at least one root certificate used for validating descendant certificates, the certificates comprising at least a public keying material for response means.

122. A computer system according to claim 121, wherein said at least one root certificate is at least two root certificates, one of said root certificates for each of said first and second response means.

123. A computer system according to claim 4, further comprising:
at least one root certificate used for validating descendant certificates, the certificates comprising at least a public keying material for response means.

124. A computer system according to claim 123, wherein said at least one root certificate is at least two root certificates, one of said root certificates for each of said first and second response means.

125. A computer system according to claim 5, further comprising:
   at least one root certificate used for validating descendant certificates, the certificates comprising at least a public keying material for response means.

126. A computer system according to claim 125, wherein said at least one root certificate is at least two root certificates, one of said root certificates for each of said first and second response means.

127. A computer system according to claim 3, wherein said protection mechanism is used for one of copy protecting software and for licensing software.

128. A computer system according to claim 4, wherein said protection mechanism is used for one of copy protecting software and for licensing software.

129. A computer system according to claim 5, wherein said protection mechanism is used for one of copy protecting software and for licensing software.

130. A method according to claim 36, wherein the secret keying material is private keying material of a second asymmetric key pair.

131. A method according to claim 36, wherein the secret keying material is keying material of a symmetric key pair.

132. A method according to claim 36, further comprising the step of:
   interacting via a protocol that resists chosen-plaintext attacks by a storage system that holds at least some of the private keying material.

133. A method according to claim 36, further comprising the step of:
   interacting via a protocol that resists adaptive chosen-plaintext attacks by a storage system that holds at least some of the private keying material.

134. A method according to claim 36, further comprising the steps of:
   accessing a first private keying material by the first response means, and
   accessing a second private keying material by the second response means.

135. A method according to claim 36, wherein in at least second challenge means has no access to and no knowledge about the private keying material stored in any of the at least two response means.

136. A method according to claim 36, further comprising the steps of:
   securely storing in the at least two response means a license server's private key, respectively.

137. A method according to claim 36, further comprising the steps of:
   marking the information using at least one of:
      digital signature,
      asymmetric confidentiality, and
      probabilistic proof.

138. A method according to claim 135, wherein said asymmetric confidentiality is used which is the Blum-Goldwasser scheme.

139. A method according to claim 135, wherein said probabilistic proof is used which is a zero knowledge proof scheme.

140. A method according to claim 135, wherein said probabilistic proof is used which is a witness hiding proof scheme.

141. A method according to claim 36, wherein said challenge means includes means for issuing a random challenge, and further comprising the step of:
   issuing said random challenge.

142. A method according to claim 139, wherein said means for issuing a random challenge generates a random challenge by repeatedly timing responses to disk accesses.

143. A method according to claim 139, wherein said means for generating a random challenge forks new threads in such a manner as to introduce an additional degree of randomness into said random challenge by exploiting unpredictabilities in the operating system's scheduler.

144. A method according to claim 139, wherein said means for generating a random challenge performs a statistical test to determine the number of random bits obtained by each of said disk accesses, and means for causing disk accesses to be repeated until a predetermined number of random bits has been obtained.

145. A method according to claim 36, further comprising the step of:
   embedding said challenge means in said protected item of software.

146. A method according to claim 36, further comprising the step of:
   using the first public keying material for encrypting the information by said challenge means.

147. A method according to claim 36, further comprising the step of:
   providing a keyfile for holding the first public keying material.

148. A method according to claim 145, further comprising the step of:
   cryptographically securing the first public keying material held in said keyfile, whereby it is computationally infeasible to alter any portion of the keyfile, including the first public keying material, without altering the challenge means.

149. A method according to claim 146, wherein said keyfile includes information identifying the customer to which the protected item of software has been supplied.

150. A method according to claim 146, wherein said keyfile includes decoy bits for disguising the first public keying material held therein.

151. A method according to claim 146, wherein said keyfile includes information concerning selective activation of services of the protected item of software.

152. A method according to claim 36, further comprising the step of:
   using at least two root certificates, one for each response means, respectively, for validating descendant certificates, the at least two root certificates including at least a public keying material for each response means, respectively.

153. A method according to claim 36, further comprising the step of:
   using said system for at least one of copy protecting software and for licensing software.

* * * * *